(12) United States Patent
Yamaoka

(10) Patent No.: US 10,362,731 B2
(45) Date of Patent: Jul. 30, 2019

(54) GARDENING TOOL, PARTICULARLY A GRASS TRIMMER

(71) Applicant: CHERVON (HK) LIMITED, Wanchai (HK)

(72) Inventor: Toshinari Yamaoka, Nanjing (CN)

(73) Assignee: CHERVON (HK) LIMITED, Wanchai (HK)

( * ) Notice: Subject to any disclaimer, the term of this patent is extended or adjusted under 35 U.S.C. 154(b) by 262 days.

(21) Appl. No.: 15/077,392

(22) Filed: Mar. 22, 2016

(65) Prior Publication Data
US 2016/0278288 A1 Sep. 29, 2016

(30) Foreign Application Priority Data

Mar. 25, 2015 (CN) .......................... 2015 1 0134597

(51) Int. Cl.
*A01D 34/78* (2006.01)
*A01D 34/81* (2006.01)
*A01D 34/90* (2006.01)

(52) U.S. Cl.
CPC ............ *A01D 34/81* (2013.01); *A01D 34/78* (2013.01); *A01D 34/902* (2013.01); *A01D 2034/907* (2013.01)

(58) Field of Classification Search
CPC .. A01D 34/08; A01D 34/78; A01D 2034/907; A01D 34/902; A01D 34/82
See application file for complete search history.

(56) References Cited

U.S. PATENT DOCUMENTS

| | | | | |
|---|---|---|---|---|
| 4,095,043 A * | 6/1978 | Martin | .................. | H01B 17/58 174/135 |
| 5,265,341 A * | 11/1993 | Kikuchi | .............. | A01D 34/902 30/276 |
| 6,014,812 A * | 1/2000 | Webster | ............ | A01D 34/4163 30/276 |
| 9,955,627 B2 * | 5/2018 | Nakano | ................ | A01D 34/828 |
| 10,079,453 B2 * | 9/2018 | Nie | .......................... | B25F 5/00 |
| 2010/0313429 A1 * | 12/2010 | Yamaoka | .............. | A01D 34/90 30/276 |
| 2011/0241457 A1 * | 10/2011 | Muller | ................. | A01D 34/902 310/50 |
| 2012/0104983 A1 * | 5/2012 | Tanimoto | .............. | A01D 34/78 318/400.22 |
| 2013/0270933 A1 * | 10/2013 | Kraetzig | ............... | H02K 7/145 310/50 |
| 2014/0190017 A1 * | 7/2014 | Maynez | ................... | B25F 5/00 30/276 |
| 2014/0208598 A1 * | 7/2014 | Morita | .................. | A01G 3/053 30/276 |

(Continued)

*Primary Examiner* — Jonathan G Riley
(74) *Attorney, Agent, or Firm* — Greenberg Traurig, LLP

(57) ABSTRACT

A gardening tool such as a grass trimmer is provided with a tool head, a motor for driving the tool head, a front housing for accommodating the motor, a trigger switch for activating the motor, a trigger operable to control the trigger switch, a battery pack for providing electric energy to the motor, a circuit board for electrically connecting the motor to the battery pack, and a rear housing for accommodating the circuit board. The rear housing forms a housing chamber for accommodating the trigger switch, the circuit board, and wires between the circuit board and the trigger switch.

5 Claims, 10 Drawing Sheets

(56) References Cited

U.S. PATENT DOCUMENTS

| | | | |
|---|---|---|---|
| 2014/0208599 A1* | 7/2014 | Nagahama | A01D 34/6806 30/277.4 |
| 2014/0215835 A1* | 8/2014 | Racov | A01D 34/416 30/276 |
| 2014/0246214 A1* | 9/2014 | Racov | A01D 34/902 173/217 |
| 2014/0259692 A1* | 9/2014 | Racov | A01D 34/90 30/277.4 |
| 2015/0264861 A1* | 9/2015 | Kullberg | A01D 34/4163 30/276 |
| 2016/0021819 A1* | 1/2016 | Nakano | A01G 3/062 30/276 |
| 2016/0183452 A1* | 6/2016 | Kullberg | A01D 34/4161 30/276 |

* cited by examiner

GARDENING TOOL, PARTICULARLY A GRASS TRIMMER

RELATED APPLICATION INFORMATION

This application claims the benefit of CN 201510134597.3, filed on Mar. 25, 2015, the disclosure of which is incorporated herein by reference in its entirety.

FIELD OF THE DISCLOSURE

The present disclosure relates generally to gardening tools, and more particularly to grass trimmers.

BACKGROUND OF THE DISCLOSURE

A gardening tool such as a grass trimmer has an operating handle and a power portion to couple with a battery pack. The operating handle and the power portion are constructed as two separate parts at present. This construction makes a waste of material, and a wire positioned between the operating handle and the power portion is often undesirably exposed.

The statements in this section merely provide background information related to the present disclosure and may not constitute prior art.

SUMMARY

In one aspect of the disclosure, a gardening tool includes a trimmer head, a motor for driving the trimmer head, a front housing for accommodating the motor, a trigger switch for activating the motor, a trigger for being operated to control the trigger switch, a battery pack for providing electric energy to the motor, a circuit board for electrically connecting the motor to the battery pack, and a rear housing for accommodating the circuit board.

Preferably, the rear housing includes a connecting portion for detachably connecting with the battery pack and a handle portion for being griped by the user which is disposed between the motor and the circuit board.

Furthermore, wherein when the battery pack is connected to the rear housing, at least one part of the battery pack is preferably exposed outside of the rear housing.

Furthermore, the rear housing preferably forms an air inlet at the connecting portion.

Furthermore, the rear housing may further comprise an accommodating portion, which has an accommodating chamber for accommodating the trigger switch, where the rear housing may further form an air inlet at the accommodating portion.

Furthermore, the rear housing may further comprise an accommodating portion, which has an accommodating chamber for accommodating the trigger switch, where the rear housing may further form a first air inlet at the connecting portion and a second air inlet at the accommodating portion.

Furthermore, the rear housing may further comprise an accommodating portion, which has an accommodating chamber for accommodating the trigger switch, and the accommodating portion may be disposed between the motor and the handle portion.

Furthermore, the rear housing may further comprise an accommodating portion, which has an accommodating chamber for accommodating the trigger switch, and the handle portion may be disposed between the connecting portion and the accommodating portion.

Furthermore, the rear housing may form a support surface for supporting the arm of the user when the user uses the ipsilateral hand to grip the handle portion.

Furthermore, the direction in which the support surface substantially extends and the length direction of the handle portion may intersect at an obtuse angle.

Furthermore, the gardening tool may further include a connecting means for connecting the front housing and the rear housing, and a fan for generating an airflow from the inside of the rear housing to the inside the front housing, wherein the connecting means forms an air channel for allowing the airflow to flow from the inside of the rear housing to the inside the front housing.

Furthermore, the rear housing ay form a plurality of air inlets for allowing airflows to flow into the rear housing.

Furthermore, the gardening tool may further include a connecting means for connecting the front housing and the rear housing and a connecting wire may be disposed inside the handle portion where the rear housing forms a clip structure for clipping the connecting wire at the inside of the handle portion.

Furthermore, the gardening tool may further include a speed-control button for being operated to control the rotational-speed of the motor with the speed-control button being slidably disposed at the rear housing.

In another aspect of the disclosure, a gardening tool includes a tool head, a motor for driving the trimmer head, a front housing for accommodating the motor, a trigger switch for activating the motor, a trigger for being operated to control the trigger switch, a battery pack for providing electric energy to the motor, a circuit board for electrically connecting the motor to the battery pack, and a rear housing for accommodating the circuit board.

The rear housing preferably forms a housing chamber for accommodating the trigger switch, the circuit board and wires between them and the rear housing may comprise a connecting portion for detachably connecting with the battery pack. A handle portion for being griped by the user may be disposed between the motor and the circuit board.

Furthermore, the battery pack may be connected to the rear housing with at least one part of the battery pack being exposed outside of the rear housing.

Furthermore, the rear housing may form an air inlet at the connecting portion.

Furthermore, the rear housing may further comprise an accommodating portion, which has an accommodating chamber for accommodating the trigger switch, and the rear housing may form an air inlet at the accommodating portion.

Furthermore, the rear housing may further comprise an accommodating portion, which has an accommodating chamber for accommodating the trigger switch, and the rear housing may form a first air inlet at the connecting portion and a second air inlet at the accommodating portion.

Furthermore, the rear housing may further comprise an accommodating portion, which has an accommodating chamber for accommodating the trigger switch, and the accommodating portion may be disposed between the motor and the handle portion.

Furthermore, the rear housing may further comprise an accommodating portion, which has an accommodating chamber for accommodating the trigger switch, and the handle portion may be disposed between the connecting portion and the accommodating portion.

Furthermore, the rear housing may form a support surface to support the arm of the user when the user uses the ipsilateral hand to grip the handle portion Furthermore, the direction in which the support surface substantially extends and the length direction of the handle portion may intersect at an obtuse angle.

Furthermore, the gardening tool may further include a connecting means for connecting the front housing and the rear housing, and a fan for generating an airflow that flows from the inside of the rear housing to the inside the front housing where the connecting means forms an air channel for allowing the airflow to flow from the inside of the rear housing to the inside the front housing.

Furthermore, the rear housing may form a plurality of air inlets for allowing airflows to flow into the rear housing.

Furthermore, the gardening tool ay further include a connecting means for connecting the front housing and the rear housing and a connecting wire may be disposed inside the handle portion where the rear housing forms a clip structure for clipping the connecting wire at the inside of the handle portion.

Furthermore, the gardening tool may further include a speed-control button for being operated to control the rotational-speed of the motor where the speed-control button is slidably disposed at the rear housing.

Further areas of applicability will become apparent from the description provided herein. It should be understood that the description and specific examples are intended for purposes of illustration only and are not intended to limit the scope of the present disclosure.

Figure 1:
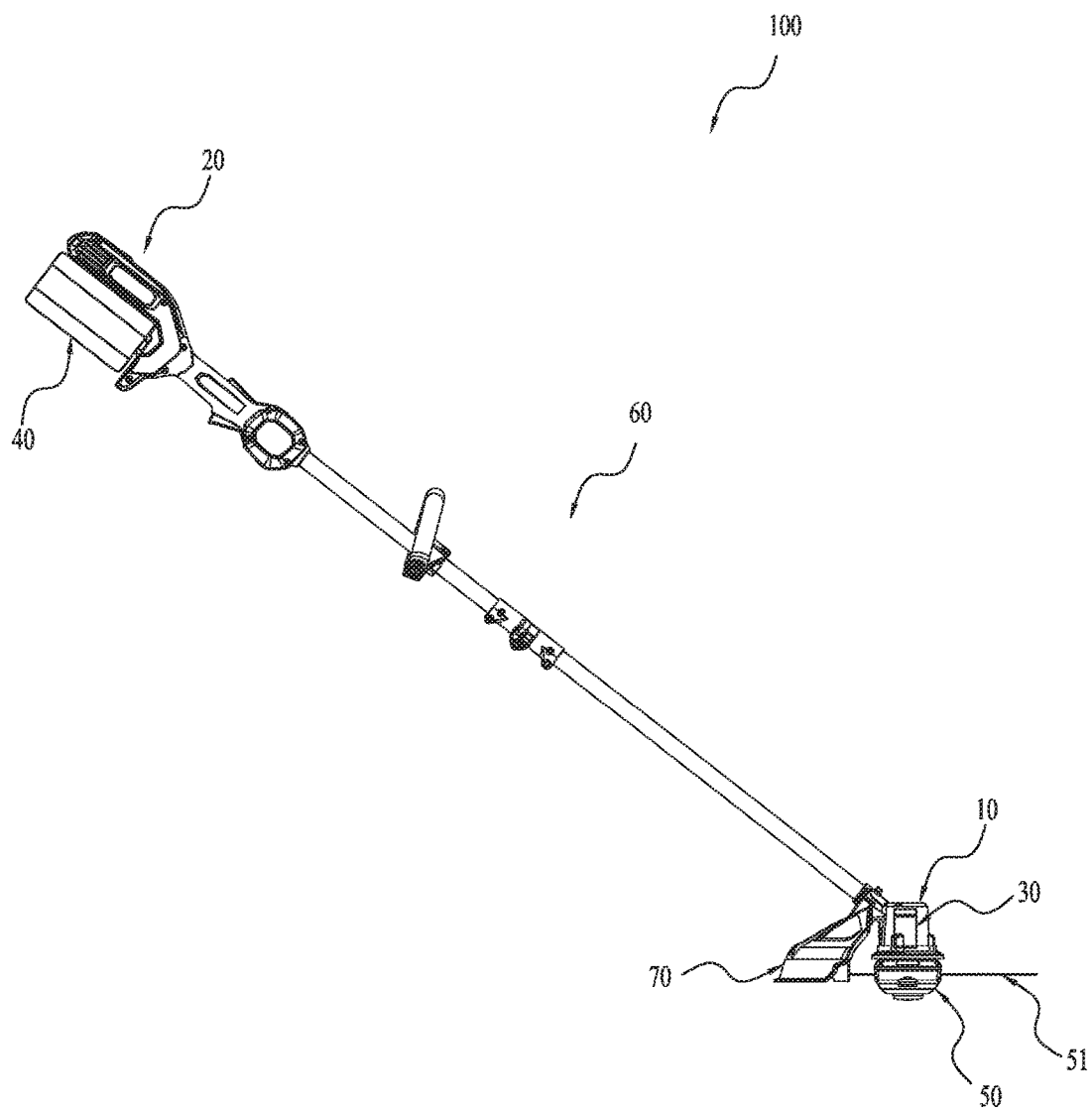
FIG. 1 is a schematic view of an exemplary grass trimmer.

The drawings described herein are for illustrative purposes only of exemplary embodiments and not all possible implementations, and are not intended to limit the scope of the present disclosure. Corresponding reference numerals indicate corresponding parts throughout the several views of the drawings.

DETAILED DESCRIPTION

The following description of the preferred embodiments is merely exemplary in nature and is in no way intended to limit the scope of the invention hereinafter claimed, its application, or uses.

Referring to FIGS. 1and 2; a grass trimmer 100 includes a front housing 10, a rear housing 20, a motor 30, a battery pack 40, a trimmer head 50, a connecting means 60 and a shield 70.

The front housing 10 is disposed at the front of the grass trimmer 100 and the rear housing 20 is disposed at the rear of the grass trimmer 100.

The front and rear herein referenced are used only to indicate a relative positional relationship not an absolute positional relationship.

The motor 30 is received in the front housing 10. The trimmer head 50 is driven by the motor 30 and connected to a cutting member 51 which is used to cut grass. The cutting member 51 may be a trimmer line or a cutting blade. It should be noted that the trimmer head 50 can be replaced by other tool heads of others gardening tools.

The battery pack 40 provides the power to the motor 30 and is capable of detachably connecting with the rear housing 20.

The connecting means 60 connects the front housing 10 and the rear housing 20 as a whole.

The shield 70 is fixed to the front housing 10 for protecting users.

Figure 2:
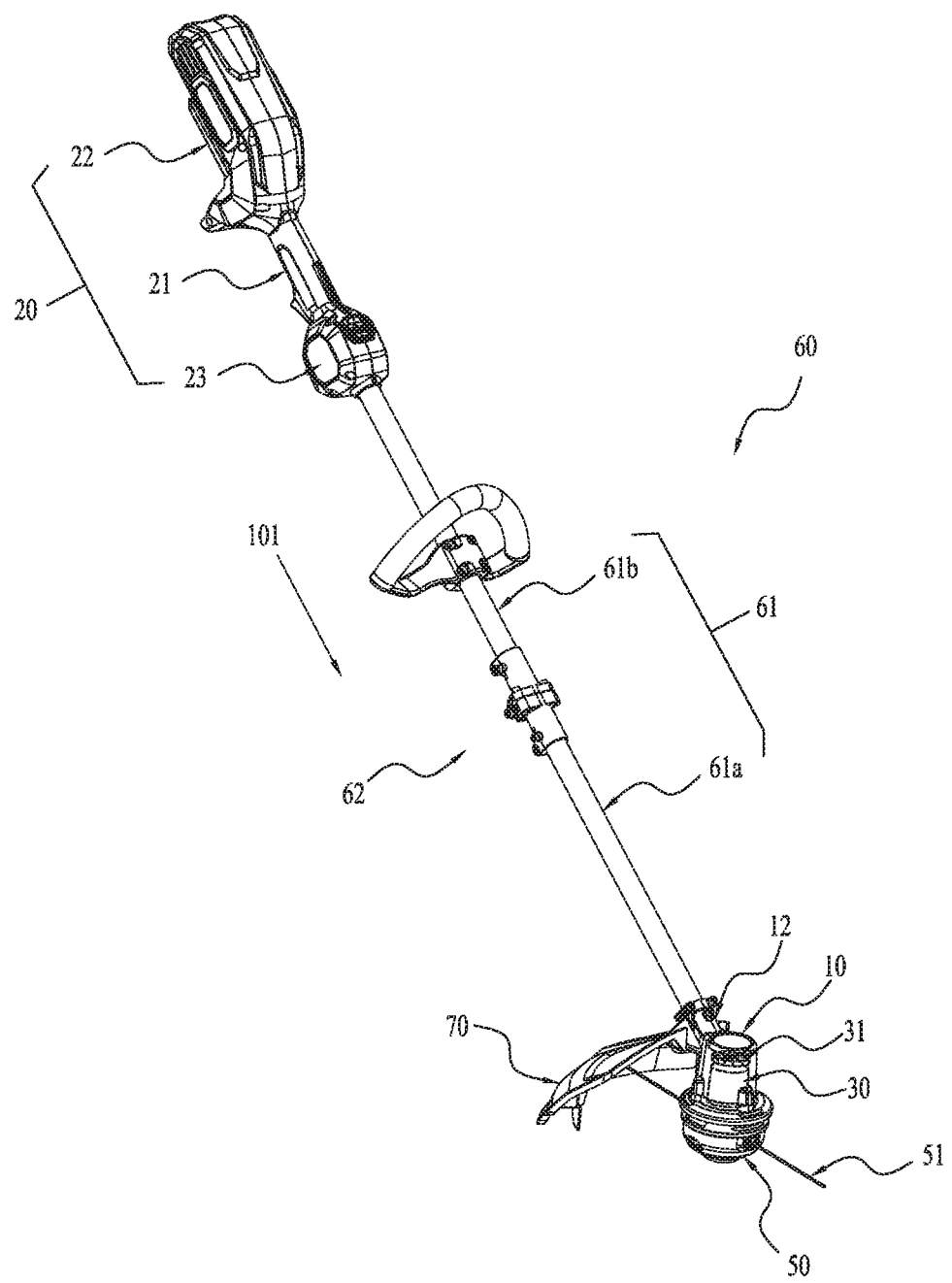
FIG. 2 shows a state of the grass trimmer in FIG. 1 without the battery pack.
Figure 3:
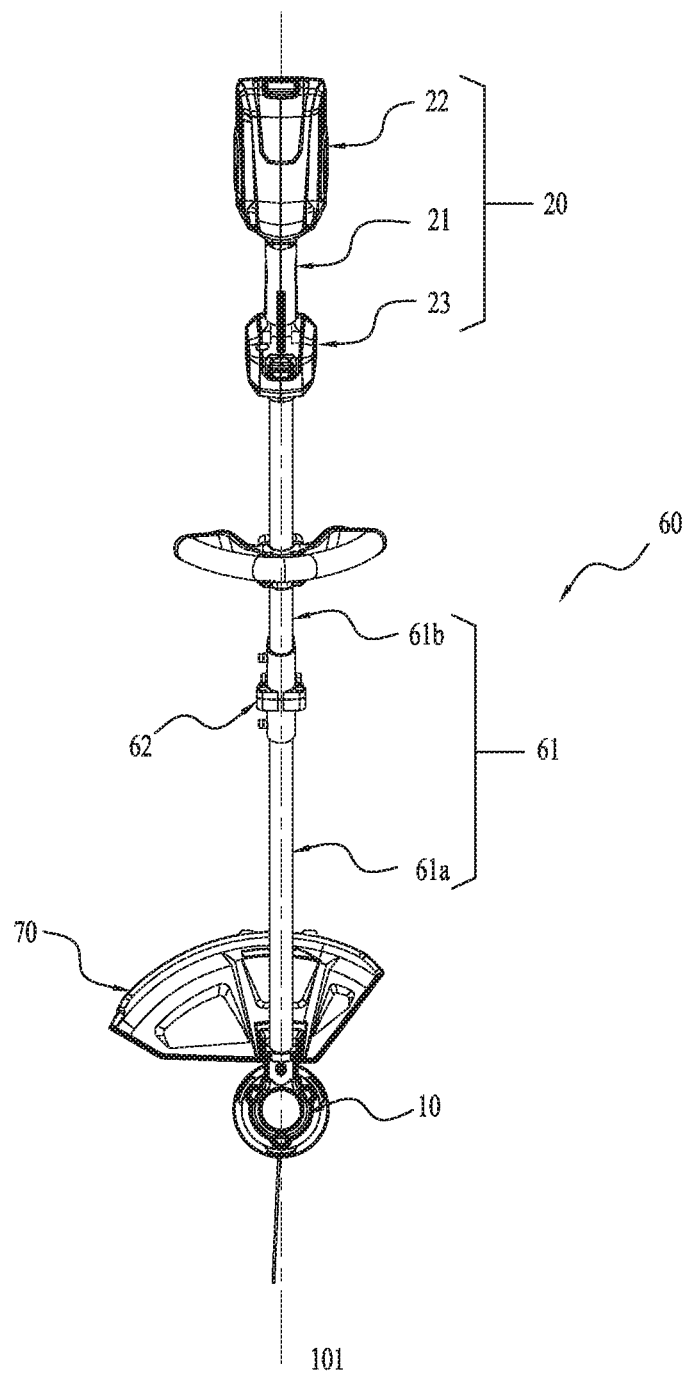
FIG. 3 shows the state as shown in FIG. 2 in another perspective.

As shown in FIG. 2 and FIG. 3, the connecting means 60 includes a connecting tube assembly 61 that extends along a first direction 101. The connecting tube assembly 61 includes a first connecting tube 61*a* and a second connecting tube 61*b*. The connecting means 60 also includes a connecting base 62. The connecting base 62 interconnects the first connecting tube 61*a* and the second connecting tube 61*b*. The first connecting tube 61*a* is connected to the front housing 10. The second connecting tube 61*b* is connected to the rear housing 20.

The connecting means 60 forms an air channel 60*a* for allowing an airflow to pass there through.

Figure 4:
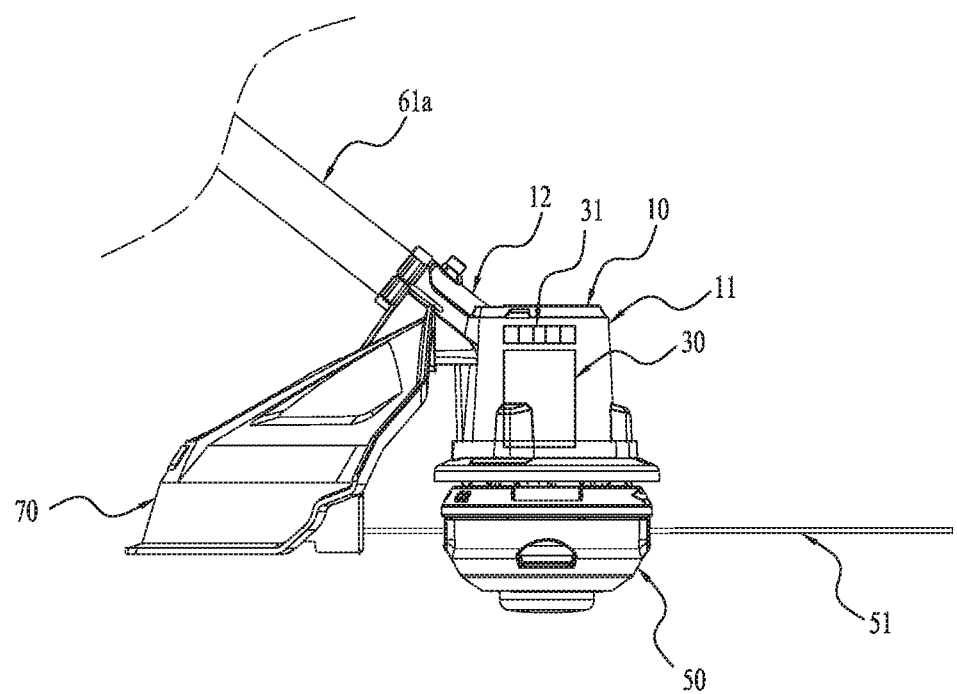
FIG. 4 is a partial view of the grass trimmer in FIG. 1.

As shown in FIGS. 2-4, the front housing 10 includes a receiving portion 11 which forms a receiving chamber 11*a* for receiving the motor 30 and a coupling portion 12 for coupling with the first connecting tube 61. The coupling portion 12 is used to connect the receiving chamber 11*a* and the air channel 60*a*.

Particularly, the receiving portion 11 and the coupling portion 12 are manufactured as one-piece.

As shown in FIG. 3, the shield 70 is installed to the connecting housing 12 of the front housing 10. The connecting housing 12 extends along a direction away from the side wall of the motor housing 11 and the extension direction oblique to and intersects with a rotating axis of the motor 30. The connecting housing 12 defines a connecting chamber interconnecting with the battery chamber. The first connecting tube 61*a* is installed through into the connecting chamber. The connecting housing provides a first mounting aperture for fixing the shield 70. In the illustrated embodiment, the first mounting aperture is a threaded hole. The shield 70 is fixed to the connecting housing 12 by a bolt fastened to a threaded hole. This has the advantage of providing a low cost construction without additional parts as well as providing convenient installation and disassembly.

Figure 5:
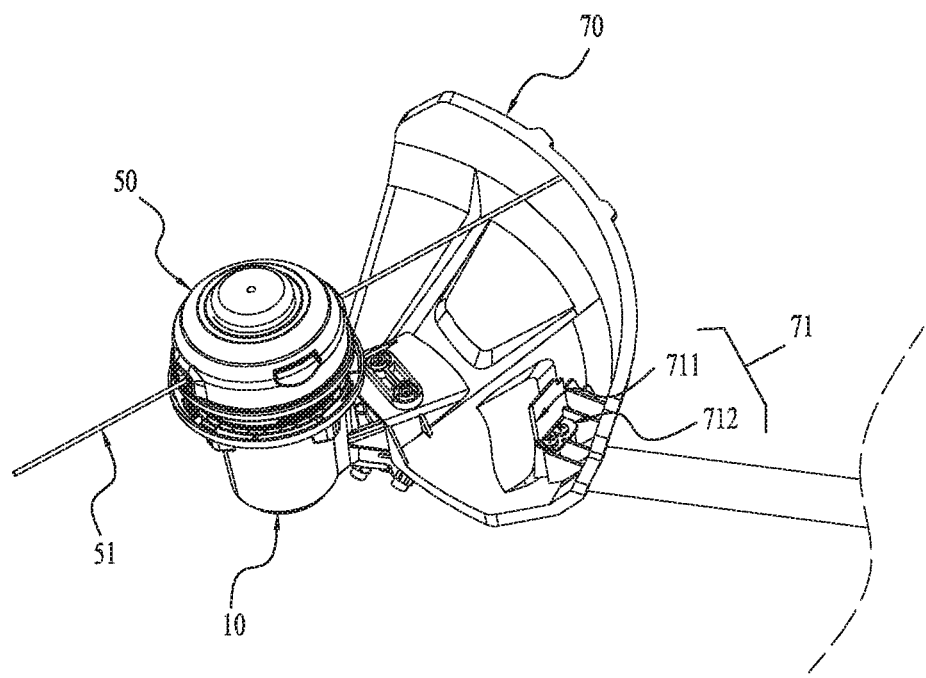
FIG. 5 is another partial view of the grass trimmer in FIG. 1.
Figure 6:
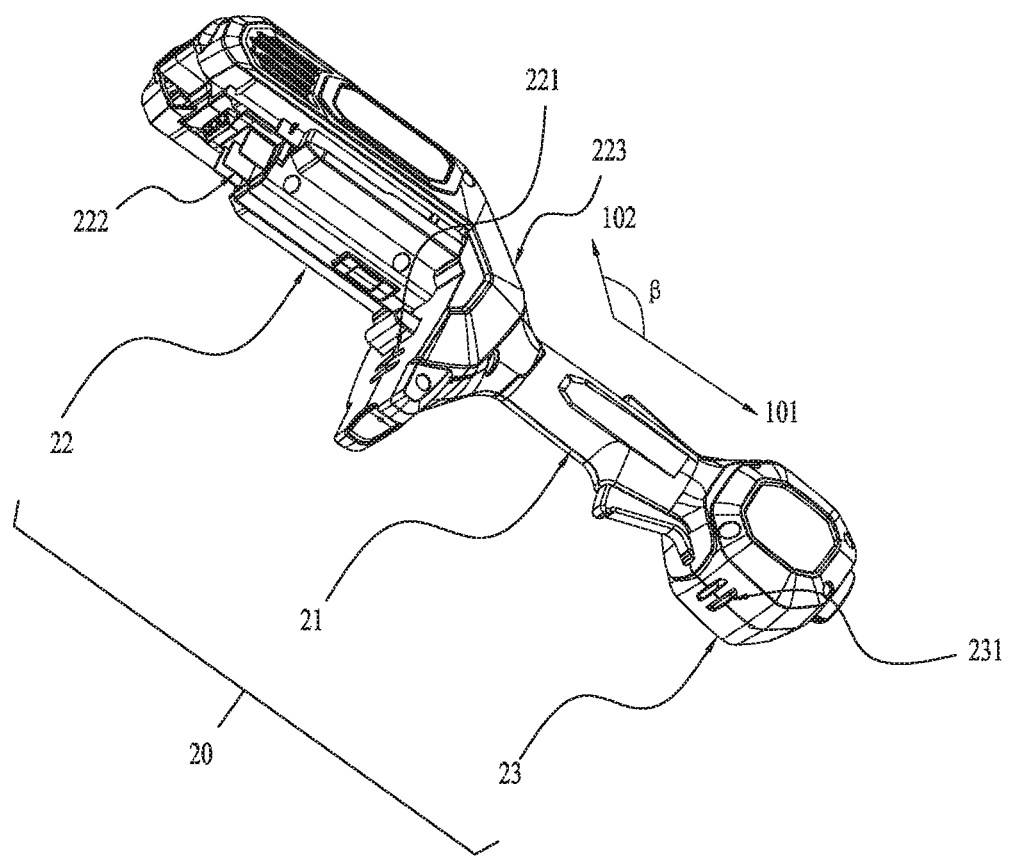
FIG. 6 shows a part of the grass trimmer in FIG. 1.

Generally, the cutting member 51 is a trimmer line. The trimmer line may abrade after use for a long time period of time which may affect the cutting quality. As shown in FIG. 5, a blade 71 is fixed at the inside of the shield 70 for cutting the trimmer line. As shown in FIG. 5, the blade 71 is constructed as an L shape. The blade 71 has a cutting edge 711 and an installing section 712 for fixing it. The cutting edge 711 is substantially perpendicular to the installing section 712. The shield 70 provides a second mounting aperture. Particularly, the second mounting aperture is a threaded hole. The blade 71 is fixed to the shield 70 by a bolt fastened to a threaded hole. The cutting edge 711 extends along a direction away from the shield 70 when the blade 71 is fixed to the shield 70.

As shown in FIG. 2-3 and FIGS. 6-10, the grass trimmer 100 further includes a trigger switch 81, a speed-control switch 82, a first connecting wire 83, a speed-control button 84, a trigger 85, a second connecting wire 86 and a circuit board 87 while the rear housing 20 includes a handle portion 21, a connecting portion 22 and an accommodating portion 23.

The trigger switch 81 is capable of activating the motor 30 and the trigger 85 is used to control the trigger switch 81. The speed-control switch 82 is capable of controlling the rotational-speed of the motor 30 and the speed-control button 84 is used to control the speed-control switch 82.

The circuit board 87 is used to electrically connect the motor the battery pack. The first connecting wire 83 is used to electrically connect the circuit board 87 to the speed-control switch 82. The second connecting wire 86 is used to electrically connect the circuit board 87 to the motor 30. The circuit board 87 is disposed inside the connecting portion 22.

The handle portion 21 is intended to be gripped by the user when the user uses the grass trimmer 100. The handle portion 21 extends substantially along a first direction 101.

Figure 8:
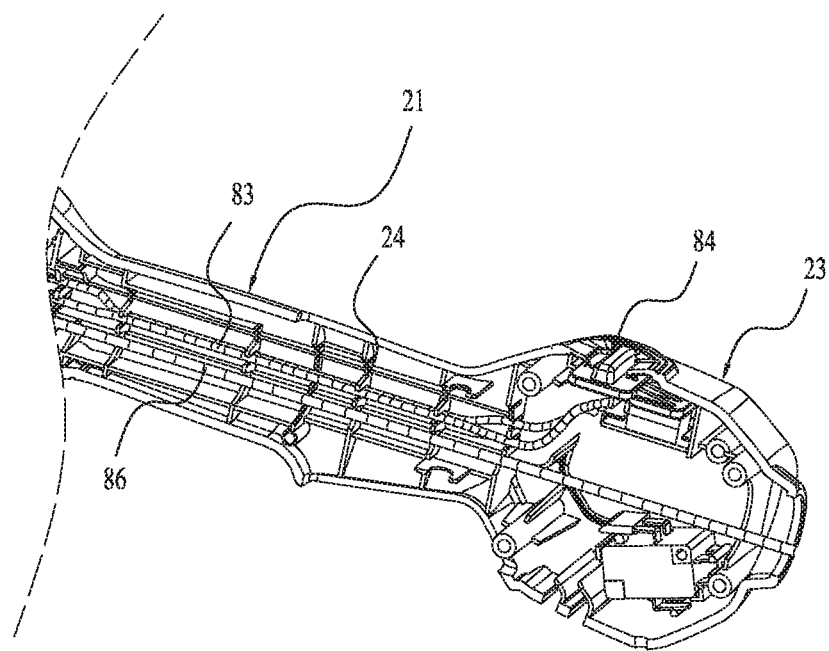
FIG. 8 shows an internal view of a part of the rear housing with the triggers and connecting means.

As shown in FIG. 8, the rear housing 20 forms a clip structure 24 for clipping the first connecting wire 83 at the inside of the handle portion 21. The clip structure 24 may include two claws 24a, 24b for contact the first connecting wire 83 at opposite sides of the first connecting wire 83. The claws 24a and 24b project inwardly.

Figure 9:
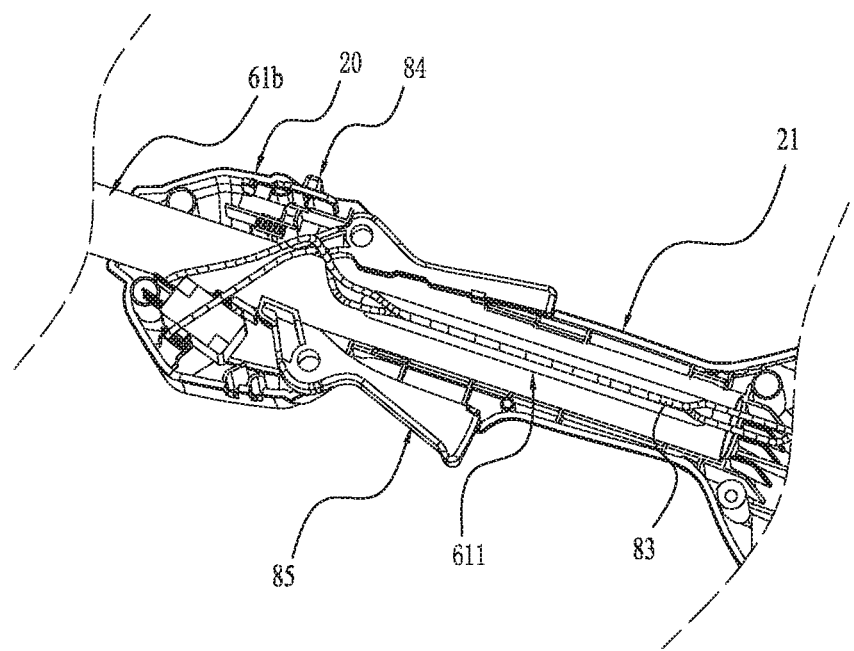
FIG. 9 shows an internal view of a part of the rear housing.

As shown in FIG. 9, the inserting part of the second connecting tube 61b in the rear housing 20 forms a wire slot 611 for allowing the first connecting wire 83 and the clip structure 24 to pass there through. The wire slot 611 allows the size of handle portion 21 to be smaller.

The connecting portion 22 is used to detachably connect with the battery pack. The handle portion 21 is located between the motor 30 and the connecting portion 22. As shown in FIG. 1, when the battery pack 40 is connected to the rear housing 20, at least one part of the battery pack 40 is exposed outside of the rear housing 20 for better heat dissipation.

Figure 7:
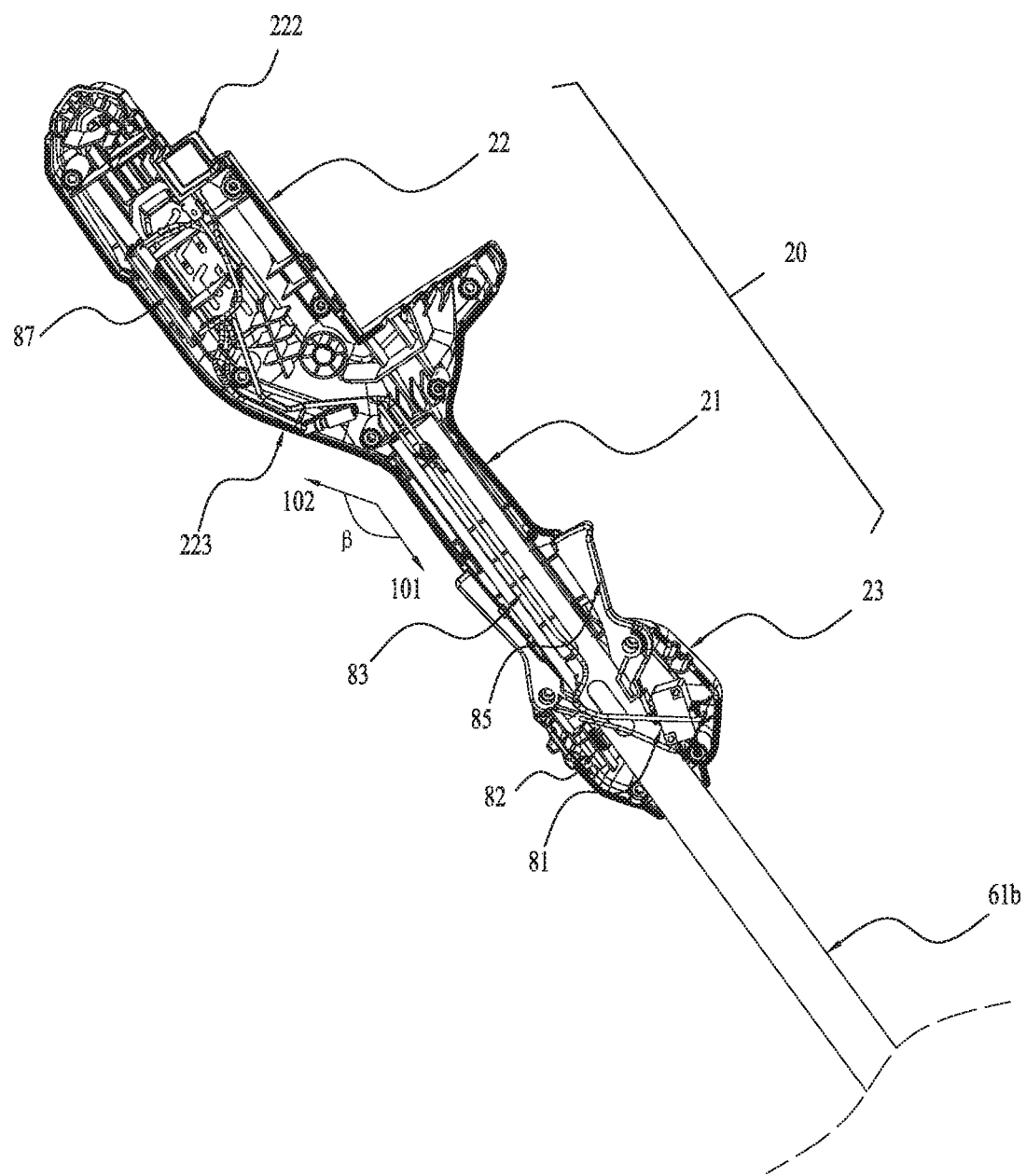
FIG. 7 shows an internal view of a part of the grass trimmer in FIG 1.

As shown in FIG. 7, the rear housing 20 forms a support surface 223 to support the arm of the user when the user uses the ipsilateral hand to grip the handle portion 21. The direction 102 in which the support surface 223 substantially extends along and the length direction (first direction 101) of the handle portion 21 intersect at an obtuse angle β. The obtuse angle β may range from 100° to 170°. Particularly, the angle β may range from 120° to 160°.

The support surface 223 will decrease weariness of users when they use the grass trimmer 100 for a long time.

The battery pack 40 has battery pack terminals, and the grass trimmer 100 has a connecting terminal 222 for electrically connecting with the battery pack terminals at the connecting portion 22. The battery pack 40 is capable of coupling to the connecting portion 22 along the directions which are parallel to the first direction 101.

The accommodating portion 23 is located between the motor 30 and the handle portion 21 and forms an accommodating chamber 23a which is used to accommodate the trigger switch 81 and the speed-control switch 82.

Figure 10:
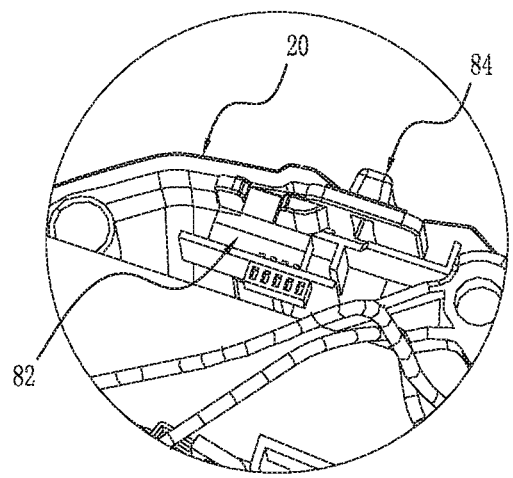
FIG. 10 is an enlarged view of the speed-control button.

As shown in FIG. 10, the speed-control button 84 is slidably connected with the rear housing at the accommodating portion 23. When a user operates the speed-control button 84 to slide to different positions, the motor 30 outputs different rotatational-speed.

As shown in FIG. 2, FIG. 3, and FIGS. 6-10, the rear housing 20 forms a housing chamber 20a which includes the accommodating chamber 23a, and the housing chamber 20a is formed from the connecting portion 22 to the accommodating portion 23. The trigger switch 81 and the circuit board 87 are all accommodated in the housing chamber 20a.

The grass trimmer 100 further includes a fan 31 inside the front housing 10 and the fan 31 is driven by the motor 30. When the fan 31 rotates, it generates an airflow which flows air from the rear housing 20 to the front housing 10 by passing the air through the air channel 60a.

For cooling the electrical components inside the rear housing 20, the rear housing 20 forms a plurality of air inlets to allow the air to flow into the rear housing 20.

Specifically, the rear housing 20 forms a first air inlet 221 at the connecting portion 22 and a second air inlet 231 at the accommodating portion 23 so as to cause the air flow to pass through the circuit board 87 and the trigger switch 81.

The above illustrates and describes basic principles, main features and advantages of the present invention. Those skilled in the art should appreciate that the above embodiments do not limit the present invention in any form, Technical solutions obtained by equivalent substitution or equivalent variations all fall within the scope of the present invention.

What is claimed is:

1. A grass trimmer, comprising:
   a trimmer head;
   a front housing;
   a motor received in the front housing for driving the trimmer head;
   a trigger switch for activating the motor;
   a trigger operable to control the trigger switch;
   a battery pack for providing electric energy to the motor;
   a circuit board for electrically connecting the motor to the battery pack;
   a rear housing formed to have a connection portion having a first air inlet, a handle portion, a support surface to support to an arm of a user when the user uses an ipsilateral hand to grip the handle portion, and a first accommodating portion, having a second air inlet, in which the circuit board is accommodated;
   a connecting tube assembly for connecting the front housing and the rear housing;
   a connecting terminal for electrically connecting with the battery pack; and
   a connecting wire disposed inside the handle portion,
   wherein the rear housing forms a clip structure for clipping the connecting wire at the inside of the handle portion and an inserting part of the connecting tube assembly in the rear housing forms a wire slot for allowing the connecting wire and the clip structure to pass therethrough,
   wherein the battery pack is detachably connected with the connecting portion, the handle portion is disposed between the motor and the circuit board, the connecting tube assembly comprises a connecting tube extending along a first direction, the battery pack is coupled with the connecting portion along the first direction, and a direction in which the support surface substantially extends and a length direction of the handle portion intersect at an obtuse angle β, and the obtuse angle β may range from 100° to 170°.

2. The grass trimmer of claim 1, wherein when the battery pack is connected to the connecting portion at least a portion of the battery pack is exposed outside of the rear housing.

3. The grass trimmer of claim 1, wherein the rear housing further comprises a second accommodating portion for accommodating the trigger switch.

4. The grass trimmer of claim 1, further comprising:
a fan for generating an airflow to flow air from an inside of the rear housing to an inside of the front housing, wherein the connecting tube assembly forms an air channel for allowing the airflow to flow from the inside of the rear housing to the inside the front housing.

5. The grass trimmer of claim 1, further comprising a speed-control button for controlling a rotational-speed of the motor wherein the speed-control button is slidably disposed at the rear housing.

* * * * *